Figure 1:
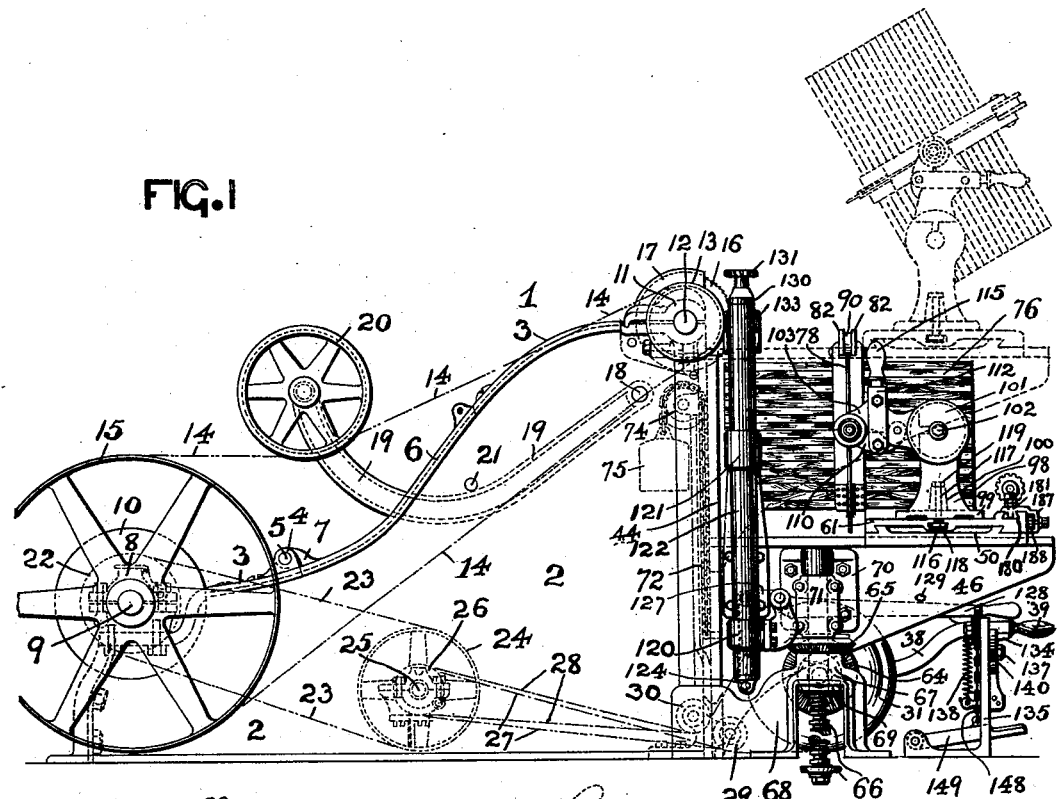

No. 705,483. Patented July 22, 1902.
M. B. TIDEY, Dec'd.
S. E. & L. V. TIDEY, Executrices.

MACHINE FOR GROOVING ASSEMBLED STOCK.

(Application filed Mar. 7, 1901.)

(No Model.) 7 Sheets—Sheet 1.

WITNESSES:

INVENTOR:
MARCUS B. TIDEY
BY
ATTORNEY

No. 705,483. Patented July 22, 1902.
M. B. TIDEY, Dec'd.
S. E. & L. V. TIDEY, Exécutrices.
MACHINE FOR GROOVING ASSEMBLED STOCK.
(Application filed Mar. 7, 1901.)
(No Model.) 7 Sheets—Sheet 2.

WITNESSES:
Ch. B. Fraentzel
Geo. A. Richards

INVENTOR:
MARCUS B. TIDEY
BY Fred K. C. Fraentzel,
ATTORNEY

No. 705,483.
Patented July 22, 1902.
M. B. TIDEY, Dec'd.
S. E. & L. V. TIDEY, Executrices.
MACHINE FOR GROOVING ASSEMBLED STOCK.
(Application filed Mar. 7, 1901.)
(No Model.)
7 Sheets—Sheet 3.
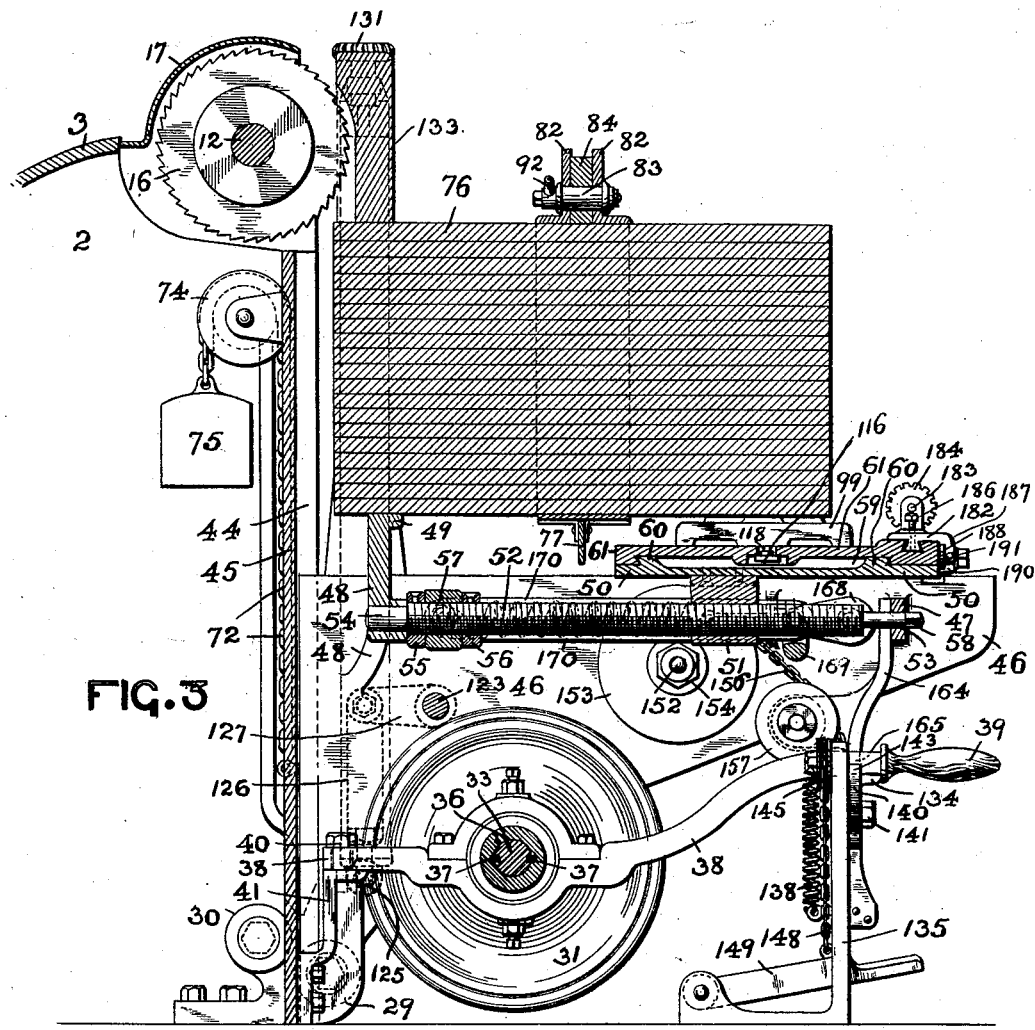
WITNESSES:
INVENTOR:
MARCUS B. TIDEY
BY
ATTORNEY

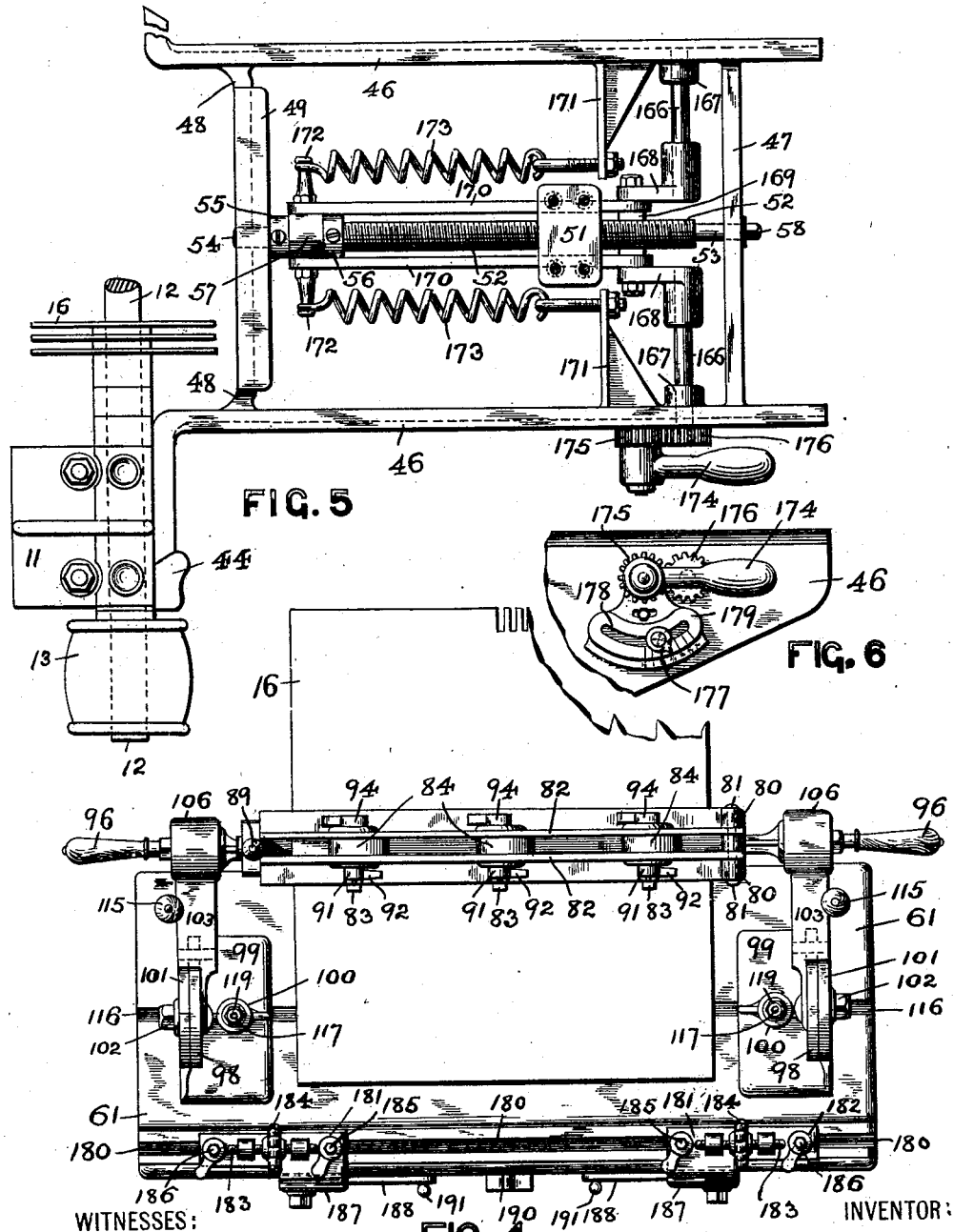

No. 705,483. Patented July 22, 1902.
M. B. TIDEY, Dec'd.
S. E. & L. V. TIDEY, Executrices.
MACHINE FOR GROOVING ASSEMBLED STOCK.
(Application filed Mar. 7, 1901.)
(No Model.) 7 Sheets—Sheet 5.
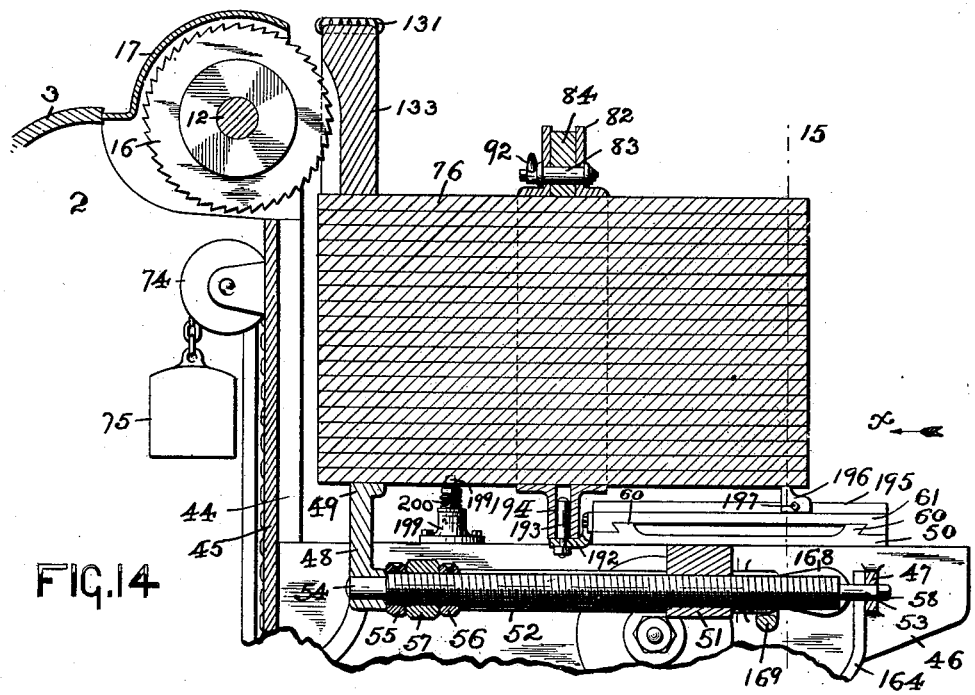
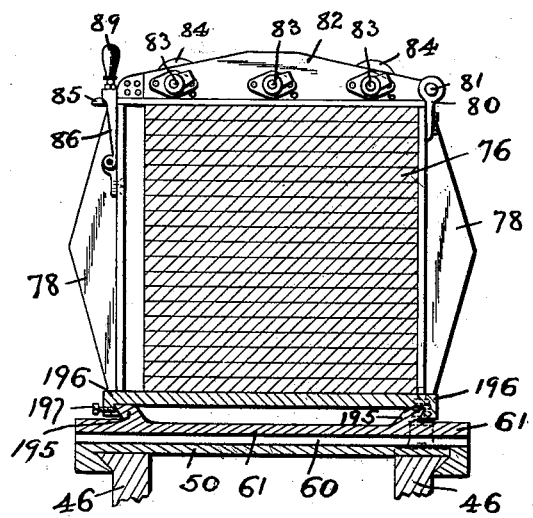
WITNESSES:
W. B. Fraentzel
Geo. F. Richards
INVENTOR:
MARCUS B. TIDEY
BY
Fred'k C. Fraentzel,
ATTORNEY No. 705,483. Patented July 22, 1902.
M. B. TIDEY, Dec'd.
S. E. & L. V. TIDEY, Executrices.
MACHINE FOR GROOVING ASSEMBLED STOCK.
(Application filed Mar. 7, 1901.)

(No Model.) 7 Sheets—Sheet 6.

WITNESSES: INVENTOR:
MARCUS B. TIDEY
BY
ATTORNEY

No. 705,483. Patented July 22, 1902.
M. B. TIDEY, Dec'd.
S. E. & L. V. TIDEY, Executrices.
MACHINE FOR GROOVING ASSEMBLED STOCK.
(Application filed Mar. 7, 1901.)

(No Model.) 7 Sheets—Sheet 7.

WITNESSES: INVENTOR:
MARCUS B. TIDEY
BY
ATTORNEY

UNITED STATES PATENT OFFICE.

MARCUS B. TIDEY, OF BELLEVILLE, NEW JERSEY; SARAH E. TIDEY AND LILLIE V. TIDEY EXECUTRICES OF SAID MARCUS B. TIDEY, DECEASED.

MACHINE FOR GROOVING ASSEMBLED STOCK.

SPECIFICATION forming part of Letters Patent No. 705,483, dated July 22, 1902.

Application filed March 7, 1901. Serial No. 50,199. (No model.)

*To all whom it may concern:*

Be it known that I, MARCUS B. TIDEY, a subject of the King of Great Britain, residing at Belleville, in the county of Essex and State of New Jersey, have invented certain new and useful Improvements in Woodworking-Machines for Grooving Assembled Stock; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention relates to that class of woodworking machinery employed for the purpose of grooving or slotting the ends of the stock employed in the construction of lock-corner boxes; and the principal purpose of this invention is, stated in general terms, to produce a mechanism or machine which shall be more simple and more effective in its general construction and arrangement of parts than machines of this character as heretofore made.

A further object of this invention is to provide, in addition to the general arrangement and construction of the assembled mechanism embodied in the machine, a novel construction of stock-holder or lock-frame in which the quantity of stock is placed and securely held, the assembled stock and the holder or lock-frame being properly placed and rotatably arranged either to rotate horizontally or vertically on a movable and adjustable bed or stock-supporting table of the machine, whereby the assembled stock can be handled and the ends thereof presented to the cutters or gang of saws and worked with increased facility, greater rapidity, reduced cost, and convenience than by the methods now in vogue in machines of this class.

A still further object of this invention is to provide a stock-holder or lock-frame with the machine, said frame having at its sides trunnions the centers of which are concentric with the central axis of the frame, said trunnions being capable of arrangement in suitable supports or pedestals on the bed or table of the machine, which are provided with bearings and a locking or holding means for holding the stock and frame in their fixed position while cutting or grooving one end of the assembled stock during the upward vertical movement of the supporting-table, then at the end of said upward vertical movement allowing of the rotation or turning of the stock and lock-frame in said bearings, whereby the opposite ends of the assembled stock may be presented to the cutters or saws and grooved or slotted during the downward and return movement of the table to its initial starting-point.

Other objects of this invention not at this time particularly mentioned will be described in the following specification.

My invention consists generally in the novel construction of machine for grooving or slotting the ends of the stock employed in the construction of lock-corner boxes; and the invention consists, furthermore, in the general arrangements and constructions of the various devices and mechanism hereinafter fully set forth, as well as in the special features and details of construction, all of which will be particularly described in the accompanying specification and finally pointed out in the clauses of the claim.

The invention is clearly illustrated in the accompanying drawings, in which—

Figure 11:
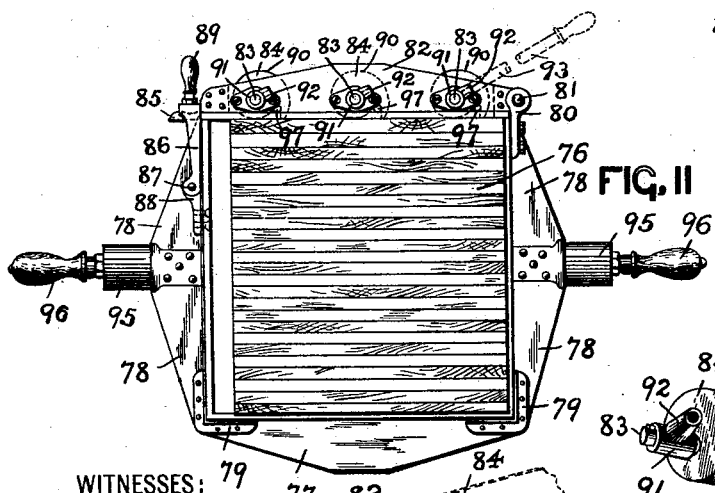
Figure 10:
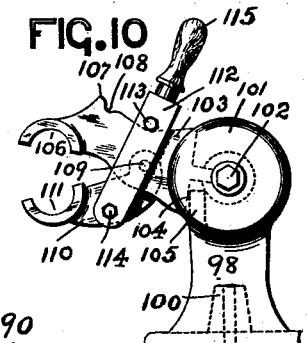
Figures 12, 13:
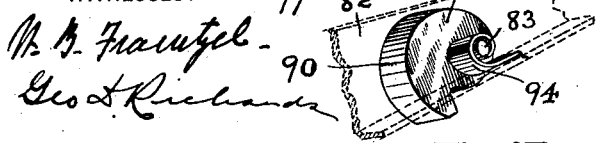
Figure 2:
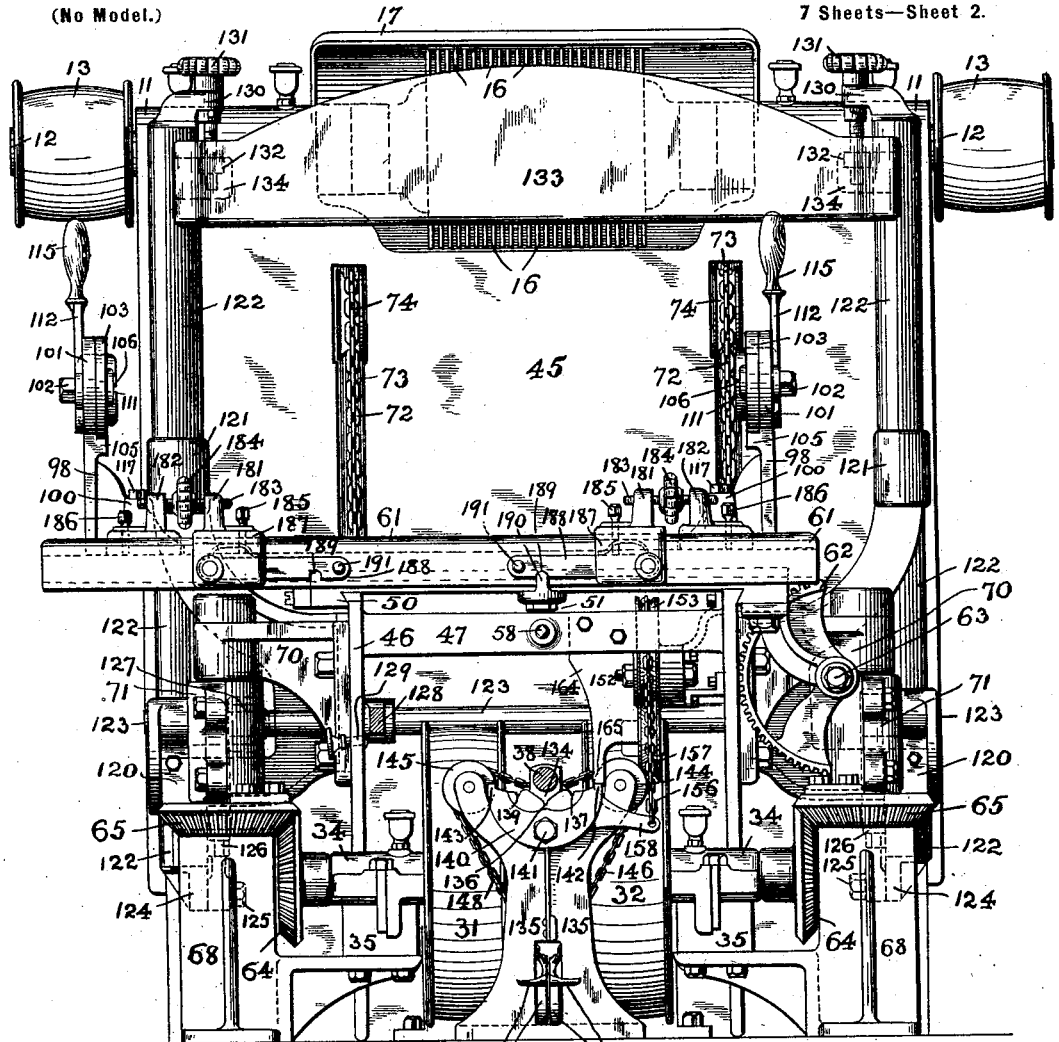
Figures 8, 9:
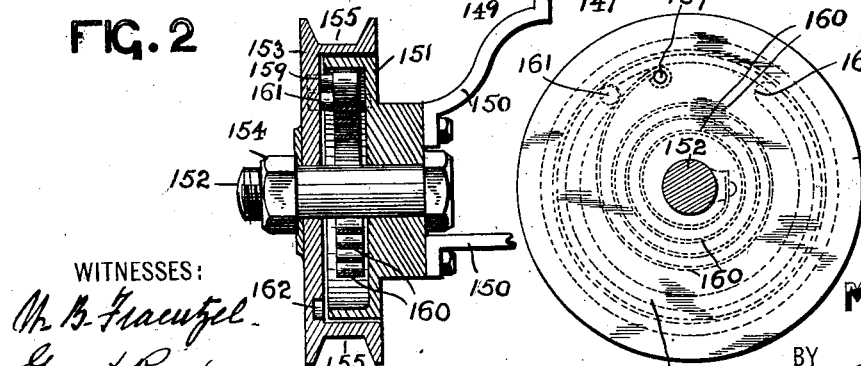
Figure 16:
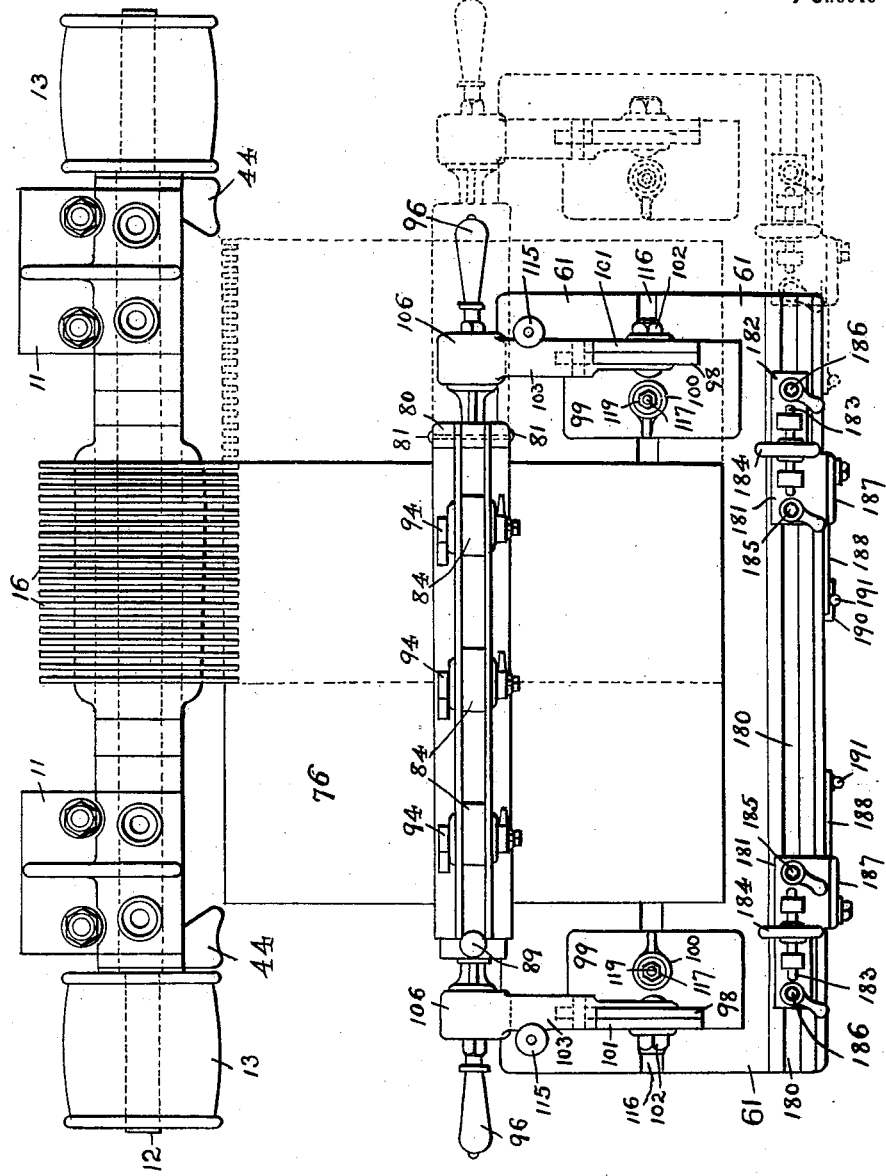
Figure 17:
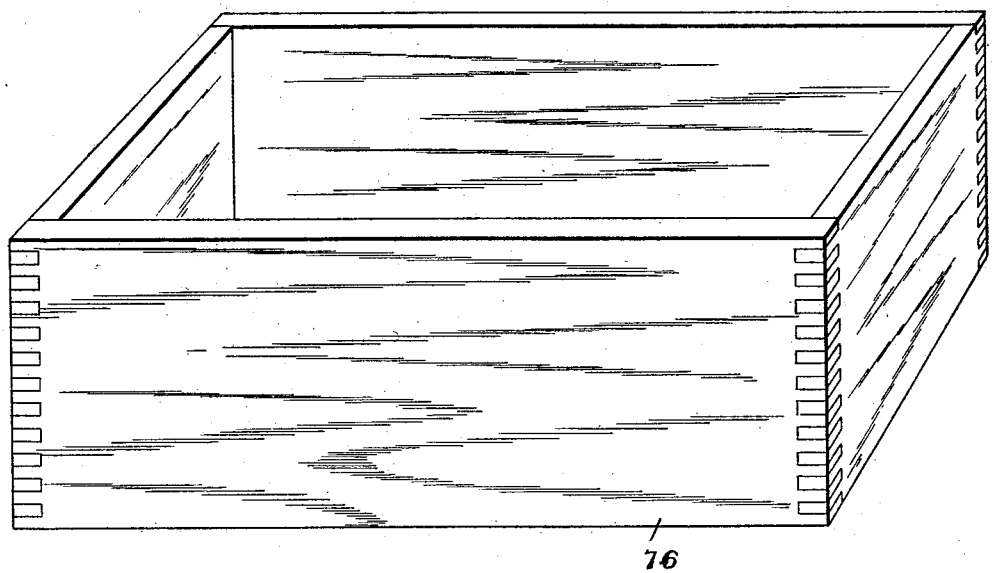
Figure 18:
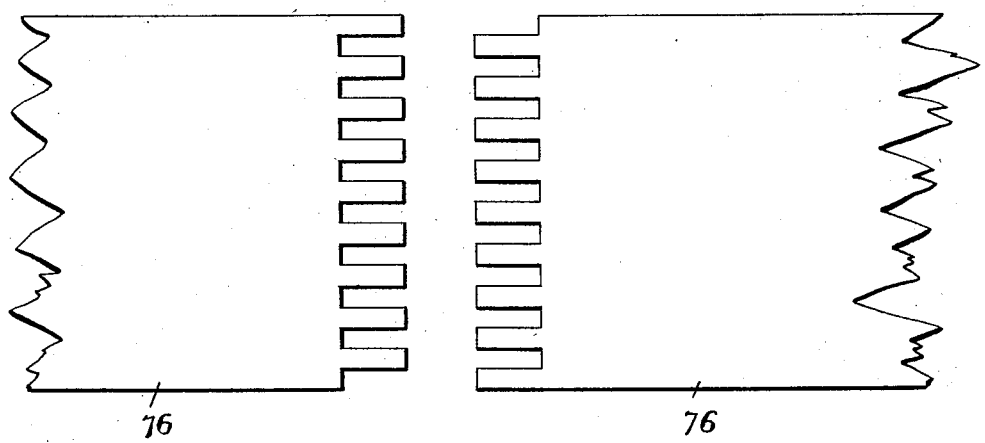

Figure 1 represents a side elevation of a machine which constitutes an embodiment of my invention. Fig. 2 is a front end view of the machine on an enlarged scale, the stock and stock-holder or lock-frame, however, being omitted from this view. Fig. 3 is a longitudinal vertical section of the front working end of the machine, taken centrally through the cutter-shaft and cutters, the stock-supporting table, the various feed devices, and clutch mechanism, and also through the stock and its lock-frame, the several parts being represented in their initial and adjusted positions prior to starting the machine and prior to the upward vertical movement of the supporting-table and the stock which is to be grooved or slotted. Fig. 4 is a plan or top view of the supporting-table and the standards or supports in which the stock-holder or lock-frame and stock therein are arranged, said frame being represented in end elevation. Fig. 5 is a plan view of a portion of the framework on which the table is supported, said view also illustrating in plan one form of mechanism for causing a longitudinal adjustment of the table in a direction toward the cutting edges of the cutters or saws and a spring mechanism for quickly moving the table in an opposite direction should the cutting edges of the cutters or saws require to be withdrawn from the grooves or slots cut in the ends of the assembled stock. Fig. 6 represents a portion of said frame, a slotted sector and index, a handle, and gear device adapted to be actuated by the handle for throwing the links represented in said Fig. 5 out of alinement with the central axis of said crank-shaft and its crank members for the purpose of the withdrawal of the grooved or slotted ends of the stock from the cutting edges of the cutters or saws. Fig. 7 is a detail vertical section of a clutch mechanism and a portion of a shaft on which it is arranged for causing the vertical upward and downward movements of the stock-supporting table. Fig. 8 is a face view, and Fig. 9 is a vertical cross-section, of a starting and stopping device for actuating the clutch mechanism for causing the vertical upward movement of the table and stopping the mechanism when the table has reached its highest point or for starting the table on its downward movement and stopping it at its initial starting-point for removal of the grooved stock and the replacing of the same by another batch of stock to be grooved. Fig. 10 is a side view of one of the standards or pedestals and holding device in which one of the trunnions of the stock-holder or lock-frame is to be arranged. Fig. 11 is an end view of the assembled stock and a side view of the stock-holder or lock-frame before it is placed in position in the machine, and Figs. 12 and 13 are two perspective views of one of the presser-cams employed with the stock-holder or lock-frame. Fig. 14 is a longitudinal vertical section of the stock-supporting table and lock-frame and stock held therein, illustrating another means of rotating the stock and its frame in a horizontal plane upon the supporting-table of the machine for the presentation of the opposite ends of the stock to be grooved to the cutters or saws; and Fig. 15 is a vertical cross-section taken on line 15 15 in said Fig. 14 looking in the direction of the arrow x in said Fig. 14. Fig. 16 is a diagrammatic plan of the upper platen and assembled stock and mechanism, illustrating the assembled stock of greater width than the maximum capacity of the cutters. Fig. 17 is a perspective view of the completed lock-corner box, and Fig. 18 is a representation of the respective ends of two pieces of stock before locked together.

Similar numerals of reference are employed in all of the said above-described views to indicate corresponding parts.

In the said drawings, 1 indicates the complete machine, which consists, essentially, of the machine-frame, comprising a pair of side frames 2, of any desirable configuration in outline, and has an inclosing top 3. This top is preferably provided with perforated ears or lugs 4 and a pin or pins 5 for arranging thereon the perforated ears or lugs 7 of a suitable cover or lid 6, as clearly illustrated in Fig. 1 of the drawings. At or near the lower and rear end this machine-frame is provided with suitable bearings 8, in which is rotatably arranged a main driving-shaft 9, provided with a driving-pulley 10. At or near the upper and forward end of the said side frames 2 are suitable bearings 11, in which is rotatably arranged a shaft 12, having at one or both ends a pulley 13 for driving said shaft by means of the belts 14 from a pulley or pulleys 15 on the main driving-shaft 9. Upon the shaft 12 are arranged and secured thereon in any desirable manner a gang of rotary cutters or saws 16 of any desirable size and shape. Suitably secured to the inner ends of the cutter-spindle boxes, so as to partly inclose the gang of cutters or saws 16, is a hood 17.

Pivotally secured upon a suitable shaft, rod, or pins 18 in the side frames 2 is a suitable frame 19, which is provided with a wheel or wheels 20. This wheel 20 rests upon the upper surface of the moving belt or belts 14, passing over the pulley or pulleys 13, and acts as a belt-tightener. To hold the wheel 20 away from contact with the belt or belts 14, a pin 21 in the side of the frame 2 is withdrawn and the frame 19 sufficiently raised to bring the pin 21 when again inserted in position in the frame 2 below the frame 19, and thereby support said frame 19 in its raised position, with the wheel 20 away from contact with the belt 14. The main driving-shaft 9 is also provided with a pulley 22, which by means of a belt 23 drives a pulley 24, arranged upon a counter-shaft 25. Upon this shaft 25 is a pulley wheel or wheels 26, and 27 and 28 are a pair of belts passing over said wheel or wheels 26 and respectively over the idlers 29 and 30 and then over the wheels 31 and 32, respectively, of a suitable clutch device on the shaft 33, substantially in the manner and for the purposes to be presently more fully set forth. The said shaft 33, as will be seen from an inspection of Fig. 2, rotates in suitable bearings 34 of the brackets 35. The said pulley-wheels 31 and 32 are loosely arranged on said shaft, and the belt 27 rotates the pulley-wheel 31 in one direction, while the other belt 28, which is twisted, rotates the other wheel 32 in an opposite direction. It will be noticed from Figs. 3 and 7 upon the shaft 33 is movably arranged a hub or collar device 36, which has a laterally-sliding motion on the keys or ways 37 and can be moved in either direction by means of a lever 38, which is provided at its forward end with a handle 39 and is pivotally attached at the rear by means of a pin 40 to a bracket 41.

Thus it will be evident that by moving the lever 38 to the left or right either of a pair of friction disks or wheels 42 and 43 can be made to engage with the cone-surfaces of the wheels 31 and 32, and in this manner the rotary motion of the shaft can be in either direction at the will of the operator. The lateral movements of the lever 38 may also be controlled automatically by means of a starting and stopping device, which is to be more fully described hereinafter.

As will be seen from Figs. 1, 2, and 3, the main table, upon which the stock which is to be grooved or slotted is placed, is suitably supported and is movably arranged in the vertical guide portions or rails 44, formed on the front plate 45 of the machine-frame, these parts being made on the general principles of construction employed in the well-known forms of shaping or planing machines.

The stock-supporting table of my novel construction of machine consists, essentially, of a pair of forwardly-extending bracket-like frames 46, connected at or near the front by a cross-bar 47 and at or near the back by an upwardly-extending cross-bar 48, having a supporting portion 49. Slidably arranged in a longitudinal direction upon the upper surfaces of said bracket-like frames 46 is a lower platen 50, which has secured upon its under side a screw-threaded nut or sleeve 51 and which in turn is arranged on a screw 52. Said screw 52 has its forward end 53 arranged in a bearing portion in the cross-bar 47, and its rear end 54 is arranged in a similar bearing portion in the cross-bar 48, a pair of fixed collars 55 and 56 and a sleeve 57, loosely arranged near the rear end of the screw 52, preventing its displacement when operated or turned by means of a wrench placed upon the squared end 58 of the screw. Thus by turning the said screw the nut or sleeve 51 can be worked in a backward or forward direction and the platen 50 moved longitudinally upon the bracket-like frames 46, whereby the central point of axis upon which the charge is rotated in being presented to the cutters to be worked may be adjusted to a point distant from the periphery of the cutters equal to one-half of the required dimensions of the stock being worked when the cutting is being done. The said lower platen 50 may be tightened, as at 59, and is preferably provided with a pair of laterally-extending rails or guides 60, on which is arranged an upper platen 61. This upper platen is capable of a lateral sliding movement and adjustment when a toothed sector 62 (see Fig. 2) is operated by the placing of a wrench upon the squared end of its spindle 63. The table on which the stock is to be supported in the manner to be hereinafter described thus has a longitudinal movement toward the cutting edges of the cutters or saws and is also adjustable in a lateral direction to present the ends of the assembled stock in the proper manner and have the grooves cut in the desired places in the stock. To produce the vertical upward and downward reciprocating movements of the table, combining the frames 46, lower platen 50, and upper platen 61, miter-gears 64 are arranged on the ends of the shaft 33. These miter-gears 64 are in mesh with a miter or bevel gear 65 at each side of the machine. The hubs of said gears 65 are respectively provided with an internal screw-thread, one being a right-hand thread and the other a left-hand thread, and working in said screw-threaded hubs are correspondingly-threaded screws 66. The hubs of the bevel-gears 65 rotate in bearings 67 of the standards or pedestals 68; but while being capable of rotation in said bearings, whereby the screws 66 will receive an upward or downward movement, according to the direction of the rotation of the shaft 33, said gears 65 remain fixed on account of a collar 69 on each hub of the gears 65. The upper end portion of each screw 66 is fixed in bearings 70 and 71, the bearings 70 being secured to the sides of the bracket-like frames 46, substantially as illustrated in Figs. 1 and 2. Suitably secured to the back of each bracket-like frame 46 is a chain 72 or other flexible connection. Each chain passes through an opening 73 in the wall 45 of the machine-frame and is placed over sheaves or grooved wheels 74 on the back of said wall and connected with the counterbalances or weights 75.

I will now describe the construction and arrangement of the parts of the stock-holder or lock-frame and the means for supporting the assembled stock upon the upper platen 61 of the work-table.

The stock 76 is properly assembled and placed in the lock-frame, which consists, essentially, of a bottom strap 77 and a pair of side straps 78, suitably connected with the bottom strap 77 by braces 79. All the straps are preferably made of angle-iron. A hinge 80 and pin 81 are connected with one of said side straps, and pivotally connected with said pin 81 are a pair of top straps 82, which are suitably connected by means of bolts or pins 83 and are separated from each other by cam-disks 84, arranged between the contiguous surfaces of said straps 82, substantially as illustrated. The said top straps 82 are provided with a holding dog or latch 85, which is engaged by a lock-lever 86, pivoted on a bolt or pin 87 of a hinge-plate or similar device 88, secured upon the side of the other side strap 78. The lock-lever 86 has a handle 89 for the manipulation of said lever. By this means the assembled stock is held between the several straps of the lock-frame, and the stock can then be firmly clamped in position against displacement and distortion by bringing the cam-surfaces 90 of the cam-disks down upon the surface of the upper board of the stock in the frame. That the said cams may be quickly operated, a sleeve 91 may be keyed or otherwise secured on the projecting end of each bolt or pin 83, each sleeve 91 having a socket 92 extending from its side, into which can be placed the end of a rod-bar 93 for rapidly turning the parts and bringing the cam-surfaces in tight binding engagement with the stock, as will be clearly evident. In this manner all the cams can be quickly operated by means of the rod or bar 93. (Indicated in dotted outline in Fig. 11.) Of course it will be understood that in place of the said socketed sleeves 91 I may employ any other desirable and suitable mechanism for quickly actuating the cams. To assist the return of the cam-disks to their initial positions when unlocking the parts of the lock-frame from the grooved or slotted stock, a suitable spring 94 may be employed with each pin or bolt 83, as illustrated in Fig. 13, which spring is wound up tightly when the pin or bolt and its cam are set in their binding or holding positions and tends to unwind itself when the cam is returned to its initial position and brings the cam against a stop or pin 97, as shown in Fig. 11. Each side strap 78 is also provided with trunnions 95 and a pair of handles 96 for handling the assembled stock in lifting it into or from the machine.

The holding devices for properly supporting the assembled stock in position upon the upper platen 61 of the main table is illustrated more particularly in Figs. 1, 2, 4, and 10 of the drawings and consists, essentially, of a pair of standards 98. Each standard 98 is provided with a footpiece 99, having on its inner surface a tubular boss 100, as indicated in dotted outline in Figs. 1 and 10, and upon portion of each standard is a disk or plate-like member 101, which is provided with a bearing for the reception of a bolt or pin 102. Pivotally arranged on said bolt or pin 102 is a jaw member 103, having a straight edge 104, which is brought against a stop or projection 105 on the inner side of the standard 98, whereby the said jaw member is retained in its horizontal position, or approximately so. The said jaw member 103 has on its under side at or near its forward end a semicircular recess 106, and in its upper surface it is provided with a stop 107 and a depression or recess 108. On a pin 109 is pivoted a second jaw member 110, which is provided at or near its forward end with a semicircular recess 111, corresponding to the position of the semicircular recess 108 in the other jaw member 103. The two jaw members are closed to form the bearings in which the trunnions 95 are placed, as shown in the several figures of the drawings, by forcing a stud or pin 113, connected with a lever 112, which is pivoted, by means of a pin or bolt 114, to the jaw member 110, into the recess 108 and against the stop 107 of the other jaw member 103. The said levers are each provided with handles 115. The standards 98 are centrally and slidably arranged above the undercut grooves or slots 116 in the upper platen 61 and movable outwardly according to the width of the lock-frame employed and are held or locked in their laterally-adjusted positions by bolts 117, arranged in the tubular bosses 100, said bolts being tightened by nuts 119 and having their heads 118 arranged in the slots 116, as represented in Fig. 1 of the drawings. The stockholder or lock-frame having its trunnions placed in the bearings formed by the recessed portions 106 and 111 of the two jaw members 103 and 110, the ends of the assembled stock which are to be grooved or slotted are then placed upon the support 49, hereinbefore mentioned, so as to fully rest upon the same, as clearly illustrated in Fig. 3.

Slidably arranged in suitable bearings 120 and 121, respectively secured upon a rod 123 and to the sides of the bracket-like frames 46, are a pair of rods or tubular members 122, as will be clearly seen from an inspection of Figs. 1 and 2. At the lower end of each rod or tubular member 122 is a bracket or step 124, provided with a pivotal pin or stud 125. Connected with each pin or stud 125 is a suitable link 126, the upper end of each link being pivotally connected with crank-arms 127, which are suitably secured upon the rod or shaft 123. A lever 128 is secured to the said rod or shaft 123, the said lever being held against any upward movement by being in engagement with a stop 129, as shown in Fig. 1. This stop 129, the lever 128, and the connecting-links 126, and crank-arms 127 thus retain the rod or members 122 in their vertical positions in the bearings 120 and 121. Each rod or member 122 is provided at its upper end with an angular extension 130, forming a support for the adjustable suspension-screws 131, which are provided with squared nuts 132 on their lower ends. The said nuts 132 are fitted against turning in the recessed parts 134 of a cross-bar or weight 133. When the lever 128 is pushed down, then the tubular rods or recessed members 122 and the weight 133 are raised sufficiently to permit of the proper placing and adjustment of the work-supporting table by means of the screw 52 in a longitudinal direction and by means of the toothed sector 62 in a lateral direction. When the parts have been properly adjusted, with the stock resting upon the support 49, the lever 128 is again returned to its former position and the heavy weight 133 rests upon the upper portion of the stock, as clearly illustrated in Fig. 3 of the drawings, and the several parts of the mechanism are ready for operation. By means of the pivoted lever 38 hereinabove mentioned the operator forces the friction-disk 43 in operative engagement with the pulley 32, whereby the shaft 33 is actuated, causing the screws 66 to move the several parts of the table in an upward direction and bringing the ends of the assembled stock against the cutting-surfaces of the cutters or saws, thereby grooving or slotting the one end of the assembled stock. As soon as the stock has passed and cleared the cutters in its upward movement the friction-disk 43 is thrown out of its engagement with the wheel 32 and the upward movement of the table ceases. The weight 133 is then raised from the grooved stock and the jaw members 103 and 110 made to assume vertical positions, as indicated in the dotted outline in Fig. 1 of the drawings. By means of the trunnions 95 the stock in the lock-frame is given a complete half-turn and the opposite and uncut ends of the assembled stock are placed upon the support 49, now above the cutting edges of the cutters or saws. The other friction-disk 42 is now made to engage with the pulley 31 by means of the lever 38, whereby the shaft 33 revolves in the reverse direction, causing the screws 66 to move the several parts of the table in a downward direction and bringing the uncut ends of the assembled stock against the cutting edges of the cutters or saws, whereby the opposite ends of the assembled stock are also grooved or slotted. When the parts have returned to their normal starting positions, the machine is stopped and the stock, now grooved or slotted at both ends, with the stock-holder or lock-frame, is taken from the machine and another frame and its stock are placed in the machine for the next cutting operation.

In order that the upward and downward movements of the table and parts connected therewith may be arrested automatically at the highest and at the lowest points during such upward and downward movements, I have provided the lever 38 with a V-shaped member 134, which is held, by means of a spring 138, in a centrally-arranged V-shaped depression or recess 136 in a standard 135. This standard 135 is also provided with two other V-shaped depressions or recesses 137 and 139. Pivotally arranged on a pin or bolt 141 is a sector 140, which is provided with the projections or horns 142 and 143. The said standard is also provided with a pair of sheaves or grooved rollers 144 and 145. A chain or other flexible connection 146 is attached to one side of the pivoted lever 38, said chain passing over the sheave 144 and then being attached to a foot-treadle 147. A second chain or flexible connection is in like manner attached to the other side of the lever 38, said chain passing over the sheave 145 and being attached to a second foot-treadle 149, as clearly illustrated. Now when the treadle 147 is depressed the chain 146 lifts the member 134 of the lever 38 from the recess 136 and forces it over to the right into the depression 137, whereby the friction-disk 43 engages the wheel 32, and the machine is started and operates in the manner hereinabove described.

Secured to the inner face of one of the bracket-like frames 46 by means of the brackets or arms 150 or in any other desirable manner is a chambered disk 151, through which extends a stud or pin 152, on which is rotatably arranged a second chambered disk 153, concentric with the disk 151 and held in place by a nut 154. This second disk 153 is provided with an annular peripheral groove 155, in which is wound a chain 156 or other flexible connection, which passes over a sheave 157 and has its free end secured to an arm or projection 158 of the said sector 140. Within the said chambered disk 151 is a stiff spiral spring 160, which has its inner end secured to the stud or pin 152 and its other end being connected, by means of a pin 159, with the other disk 153. Another pin or stud 161 is secured in the chamber of the disk 151, the end of said pin projecting into a groove 162 in the disk 153. Under normal conditions these several parts are in the positions indicated in Figs. 8 and 9. While these two disks are moving with the bracket-like frame 46 in an upward direction and the standard 135 remaining fixed, it will be evident that the disk 153 receives a rotation and unreels the chain 157. By the time the stock has reached its highest point during the upward vertical movement of the table and parts connected therewith the spring 160 will have become wound, the pin 161 will have moved in the slot or groove 162 and will have been brought in forcible engagement with the end 163 of said slot or groove. The chain 156 is now taut, and there being no further motion of the disk 153 possible the arm or projection 158 of the sector 140 is raised, and the member 134 of the lever 38 is forced by the projection or horn 142 from the depression 137 back to the central depression 136. The friction-disk 43 is thereby disengaged from the wheel 32 and the upward travel or movement of the parts ceases. When it is desired to start the parts on their downward travel, the treadle 149 is depressed and the member 134 of the lever 38 is moved from the central depression 136 to the depression 139 at the left, whereby the friction-disk 42 engages the wheel 31, as above stated. Immediately the table and parts connected therewith begin to travel in the downward direction, as has been previously explained. When the table and stock thereon are just about to reach the lowest point in their downward movement, the end of a finger 165 on a plate 164, which is secured against the cross-bar 53, is brought in engagement with the raised projection or horn 142 of the sector 140, and thereby the said sector resumes its normal position. (Indicated in Fig. 2 of the drawings.) At the same time the other projection or horn 143 of the sector 140 engages the member 134 of the lever 38 and lifts said member from the recess or depression 139 back to the central recess or depression 136, whereby the disengagement of the friction-disk 42 with the wheel 31 is produced and the downward movement of the stock-supporting table ceases. The disk 153 has also been caused to resume its normal position, due to the relaxation of the coils of the spring 160, and the chain 146 is again reeled up in the groove 155 of said disk with all the parts of the machine ready for another operation. In order to suddenly withdraw the slotted ends of the assembled stock from the cutting portions of the cutters or saws, I have provided the mechanism illustrated in Fig. 5. The same consists of a crank-shaft 166, rotatively arranged in bearings 167 in the two frame-pieces 46, said shaft having a pair of crank-arms 168 and a U-shaped connection or yoke 169, which extends around the screw 52, so that the crank-arms 168, a pair of links 170, pivotally connected with said arms 168, and the opposite sides of the loose collar 57 can all be brought in alinement to prevent the longitudinally-sliding motion of the screw 52 while adjusting the lower platen 50 of the table and also during the upward and downward vertical movements of the table and the cutting operations of the machine. Between a pair of brackets 171, extending from the inner sides of the frames 46, and a pair of pins 172, connected with the links 170, are springs 173, which will cause a slight forward movement of the screw 52 in its bearings, and in consequence thereof a similar movement of the stock-supporting table when a lever 174 is moved from the horizontal position (represented in Fig. 5) to a downwardly-extending position. This movement of the lever 174 causes a pinion 175 to actuate a gear 176 on the end of the crank-shaft 166, and the result is that the various parts are forced out of alinement and the springs 173 will produce a forward movement of the screw 54 and consequent forward movement of the stock-supporting table. The downward movement of the lever 174 and corresponding movement of the screw 52 is regulated by the adjustment of a stop 177, which is movably arranged in a slot 178 of the sector 179 and can be secured and set in its adjusted position to the graduations of a scale the figures of which correspond to the different depths of the grooves or slots which are being cut in the ends of the assembled stock.

For the final and precise lateral adjustment of the upper platen 61 to provide the slots or grooves in the exact places in the ends of the assembled stock a laterally-extending slot or groove 180 is formed in said upper platen, near the forward edge of the platen. In this groove are slidably arranged two pairs of dogs 181 and 182, each pair of dogs being adjustably connected by right and left screws 183 and each screw being provided with a finger piece or wheel 184 for bringing the dogs closer together or farther apart, as may be desired. The dogs 181 are provided with set-screws 185 and the dogs 182 have set-screws 186. Each pair of dogs 181 is also provided with aprons 187, which are chambered in the back, as shown, and have pivotally arranged in the said chambered back spring-actuated holding-latches 188. Each latch 188 has a recess 189, which can be fitted over a lug or projection 190 on the lower platen 50. Each latch 188 is also provided with a finger-piece 191 for lifting the latch from its holding engagement with the lug or projection 190. Thus it will be evident that after the upper platen 61 has received its approximate lateral adjustment by means of the toothed sector 62 a final and precise adjustment may be made by means of the dogs 181 and 182 in the following manner: The stock having been placed nearly in the desired position to the cutters in the way already explained for the final or exact lateral adjustment of the stock to the cutters, ganging in this instance from the left-hand side of the cutters, one of the two sets of dogs shown 181 and 182 or the set to the left-hand side is made loose, so they can move on the platen. Then their latch 188 is engaged with fixed hub 190, attached to longitudinally-sliding plate 50. The outer dog 182 is then made fast to laterally-moving platen 61, thus locking platen 61 with the fixed hub 190. Hence by turning the screw 183, which connects the two dogs 181 and 182, a micrometrical adjustment of platen 61 and a like adjustment of the stock to the cutters is effected. The exact and final adjustment having been made, the connecting-dog 181 is also made fast to the platen 61 and with their latch 188 attached to the fixed hub 190 so remains during the working of the quantity of stock for which the adjustment has been made, which in this case we will consider the side stock or the pieces constituting the sides of the frames of the boxes or stock to be worked, the adjustment of the stock to the cutters being different in the side and end pieces of the frame of the boxes. The stock comprising the side pieces having been worked, the platen 61 is disengaged from the fixed hub 190 by making loose the two dogs 181 and 182, so the platen can be moved, leaving latch 188 attached to the fixed hub 190, whereby the dogs 181 and 182 remain in their proper relative position. The stock for the ends of the frames is now placed in position for being worked and the platen moved to the right, so that the right side of the stock is brought opposite the right side or end of the gang of cutters, when the outer dog is again made fast to the platen and the final adjustment of the stock to the cutters made, as before. The inner dog is again made fast, when the end stock may also be worked.

One of the material features of my improvement is the mechanism in the construction of my machine by which a maximum width of double or any lesser width than the peripheral maximum range of the gang of cutters employed may be worked. The mechanism referred to in my improved construction of machine and by which extra width of stock may be worked is the lateral movement of platen 61, upon which the stock to be worked may be moved along the peripheral line of the cutters to a point in either direction from the cutters corresponding with the maximum range or width of the gang of cutters employed and the provision of space at each side of the gang of cutters to allow of the passage outside of the cutters of the portion of stock which may project beyond the end of the side of the cutters where the stock is being worked and double set of dogs, as will be shown. The means by which I accomplish this very desirable result by my machine is as follows: The stock-holder, of extra width and containing stock wider than the maximum range of the gang of cutters employed, is placed upon the platen 61 for presentation to the cutters in the usual way, excepting that in this case the middle of the charge is placed opposite one of the outer ends of the gang of cutters employed, so that one half of the width of the stock now being worked is opposite the cutters and the other half projects the side or end of the gang of cutters. For this process there is required two sets of the dogs for effecting the proper adjustment of the stock to the cutters, as will appear. For a right-side adjustment of the stock to the cutters I employ the pair of dogs to the left, operating them in all respects the same as already explained in the process of doing regular work. When the stock receives its proper lateral adjustment to the cutters, the first cut, one-half of the width of the stock, is made, when the latch accompanying the set of dogs which now controls the position of the stock at its first setting is lifted from its connection with stationary hub 190 and being secured to platen 61 by both of its dogs being fastened thereto remains in its secured position upon the platen. The platen is now shifted so that the now grooved portion of the stock projects beyond the opposite end of the gang of cutters, bringing the uncut portion of the charge opposite the cutters. When the other set of dogs and latch are engaged with the fixed hub 190 and the outer dogs being made fast to the platen, the adjustment of the stock to the cutters is made for the second cutting, when the inner dog of the pair now engaged is also made fast to the platen. Now it follows that the platen carrying the stock may be alternately shifted from one of its adjusted positions to the other, the latches alternately engaging the fixed hub 190, thereby placing the stock in each case at its exact adjusted position. If the gang of cutters have a facial periphery of nine inches and it is desirable to work stock eighteen inches wide, the stock is placed so that one half of its width (nine inches) is opposite the nine-inch gang of cutters and the other half of the stock (nine inches) projects the side of the cutters and is received by the space at either side of the cutters provided therefor. One-half of the full weight of eighteen inches now having been cut, as indicated in Fig. 16 of the drawings, the stock is moved from its position indicated in said Fig. 16 to the position represented in the same figure in dotted outline, so as to present the remaining uncut end portions of the assembled stock directly to the gang of cutters, so that the partially-cut end of the assembled stock may be completely finished, the two sets of dogs having been duly set so that the alternate engagement of their latches with the fixed hub 190 regulates the position of the stock to the cutters as alternately moved from one side to the other of the gang of cutters.

In Figs. 14 and 15 is illustrated another means for rotatably arranging the stock-holder and the assembled stock upon the stock-supporting table, the frame and assembled stock in this instance being capable of a rotation horizontally for the presentation of the opposite ends of the assembled stock to cutting edges of the rotary cutters or saws. As will be seen from Fig. 14, in this arrangement and construction of parts the upper platen 61 is provided at the rear with a downwardly-extending bracket 192, the said bracket being provided with an upwardly-extending wrist-pin 193. In order that the stock-holder or lock-frame may be rotatably arranged upon this pin 192, so as to be turned in a horizontal plane above the said upper platen, the lower strap-piece 77 of the stock-holder or lock-frame is provided with a tubular hub or support 194, which is placed over the said pin 193, and whereby the stock-holder and assembled stock are rotatably arranged above the table. The one end of the assembled stock rests upon the support 49, hereinabove mentioned, and the upper platen 61 may be provided with a pair of rearwardly and longitudinally extending ribs or rails 195, on which is adjustably arranged laterally-extending ribs or rails 196, upon which the other end of the assembled stock can rest, substantially as shown in Figs. 14 and 15. The said laterally-extending supporting-bar 195 can be held in its properly-adjusted position upon the rails or ribs 195 by a set-screw 197 or by any other suitable fastening means. To prevent any lateral movement of the assembled stock while the end to be slotted or grooved is being presented to the cutting edges of the cutters or saws, spring-actuated and depressible stops 198, arranged in suitable bearings or brackets 199, may be employed, as shown, the said stops extending on opposite sides of the assembled stock and being capable of being forced below the lower surface of the assembled stock against the action of the springs 200 when the stock-holder or lock-frame and the stock therein are to be turned in a horizontal plane for the presentation of the opposite and uncut ends of the stock to the cutting edges of the cutters or saws, the laterally-moving standards and connecting mechanism in this case being dispensed with.

I am fully aware that many changes may be made in the several arrangements and combinations of the various mechanism and devices herein described, as well as in the various details of the construction thereof, without departing from the scope of my present invention. Hence I do not limit my invention to the exact arrangements and combinations of the mechanism and devices described in the specification and illustrated in the accompanying drawings, nor do I confine myself to the exact details of the construction of the various parts thereof.

Having thus described my invention, what I claim is—

1. In a woodworking-machine for the purpose of grooving the ends of assembled stock, the combination, with a gang of cutters, of a vertically-rotatable stock-holder in which the assembled stock is held, and means connected with the said stock-holder arranged and constructed for the alternate presentation of the ends of the stock to the cutters of the machine for the grooving of said ends, substantially as and for the purposes set forth.

2. In a woodworking-machine for the purpose of grooving the ends of assembled stock, the combination, with a gang of cutters, of a supporting-table, a lock-frame in which the assembled stock is held, and means for mounting said lock-frame so that either end of the assembled stock is presented to the cutters of the machine to be worked, substantially as and for the purposes set forth.

3. In a woodworking-machine for the purpose of grooving the ends of assembled stock, the combination, with a gang of cutters, of a supporting-table, a rotatably-arranged lock-frame in which the assembled stock is held, and means for the presentation of either end of the stock to the cutters of the machine to be worked, substantially as and for the purposes set forth.

4. In a woodworking-machine for the purpose of grooving the ends of assembled stock, the combination, with a gang of cutters, of a supporting-table, standards on said table, a lock-frame rotatably arranged in said standards, the assembled stock being held in said frame for presentation to the cutters of the machine and the stock worked at either end by revolving the charge in the lock-frame in said standards, substantially as and for the purposes set forth.

5. In a woodworking-machine for the purpose of grooving the ends of assembled stock, the combination, with a gang of cutters, of a supporting-table, standards on said table, jaw members pivotally connected with each standard, means for closing said jaw members and providing bearings, a lock-frame rotatably arranged in said bearings, the assembled stock being held in said frame for the presentation to the cutters and the stock being worked at either end by revolving the charge in the lock-frame in said bearings substantially as and for the purposes set forth.

6. In a woodworking-machine for the purpose of grooving the ends of assembled stock, the combination, with a gang of cutters, of a supporting-table, standards on said table, jaw members pivotally connected with each standard, means for closing said jaw members and providing bearings, a lock-frame consisting of stock-holding strips, means for retaining said strips about the assembled stock, and presser-cams connected with said stock-holder, trunnions for rotatively placing said stock-holder and assembled stock in the bearings of said jaw members for presentation to the cutters and the stock to be worked at either end by revolving the charge in the lock-frame in said bearings, substantially as and for the purposes set forth.

7. In a woodworking-machine for the purpose of grooving the ends of assembled stock, the combination, with a gang of cutters, of a vertically-moving supporting-table, a lock-frame in which the assembled stock is held, means for mounting said lock-frame on said table, so that either end of the assembled stock is presented to the cutters of the machine, and mechanism for producing alternate upward and downward movements of the supporting-table for the cutting of the presented end of the assembled stock during either vertical movement of the supporting-table, substantially as and for the purposes set forth.

8. In a woodworking-machine for the purpose of grooving the ends of assembled stock, the combination, with a gang of cutters, of a supporting-table, comprising a vertically-moving frame, a longitudinally-moving lower platen on said frame, a laterally-moving upper platen, and means for adjustment of the said platens, a lock-frame in which the assembled stock is held arranged upon the upper platen, and mechanism for producing alternate upward and downward movements of said supporting-table, for the cutting of the stock during either vertical movement of the supporting-table, substantially as and for the purposes set forth.

9. In a woodworking-machine for the purpose of grooving the ends of assembled stock, the combination, with a gang of cutters, of a vertically-moving supporting-table, laterally-adjustable standards on said table, a lock-frame rotatably arranged in said standards, the assembled stock being held in said frame for presentation to the cutters of the machine, and mechanism for producing alternate upward and downward movements of the supporting-table for the cutting of the stock during either vertical movement of the supporting-table, substantially as and for the purposes set forth.

10. In a woodworking-machine for the purpose of grooving the ends of the assembled stock, the combination, with a gang of cutters, of a supporting-table comprising a vertically-moving frame, a longitudinally-moving lower platen on said frame, a laterally-moving upper platen, and means for adjustment of said platens, of a pair of laterally-adjustable standards on said upper platen, a lock-frame rotatably arranged in said standards, the assembled stock being held in said frame for presentation to the cutters of the machine, and mechanism for producing alternate upward and downward movements of the supporting-table for the cutting of the stock during either vertical movement of the supporting-table, substantially as and for the purposes set forth.

11. In a woodworking-machine for the purpose of grooving the assembled stock, the combination, with a gang of cutters, of a vertically-moving supporting-table, a pair of laterally-adjustable standards on said table, jaw members pivotally connected with each standard, means for closing said jaw members and providing bearings, a lock-frame rotatably arranged in said bearings, the assembled stock being held in said frame for presentation to the cutters of the machine, and mechanism for producing alternate upward and downward movements of the supporting-table for the cutting of the stock during either vertical movement of the supporting-table, substantially as and for the purposes set forth.

12. In a woodworking-machine for the purpose of grooving the ends of assembled stock, the combination, with a gang of cutters, of a supporting-table, comprising a vertically-moving frame, a longitudinally-moving lower platen on said frame, a laterally-moving upper platen, and means for adjustment of said platens, a pair of laterally-adjustable standards on said upper platen, jaw members pivotally connected with each standard, means for closing said jaw members and providing bearings, a lock-frame rotatably arranged in said bearings, the assembled stock being held in said frame for presentation to the cutters of the machine, and mechanism for producing alternate upward and downward movements of the supporting-table for the cutting of the stock during either vertical movement of the supporting-table, substantially as and for the purposes set forth.

13. In a woodworking-machine for the purpose of grooving the ends of assembled stock, a stock-supporting table, means for causing reciprocatory vertical movements of said table, comprising a shaft, a pair of friction devices on said shaft, means for causing the rotation of said devices in opposite directions, means for engaging and disengaging said friction devices, consisting, of a pivoted lever 38, a sleeve 36 with which said lever is connected, and friction-disks 42 and 43 on said sleeve, and means for actuating the said lever 38, consisting, of a standard 135, having depressions 136, 137 and 138, a V-shaped member 134 on said lever adapted to be arranged in said depressions, foot-treadles for forcing said member from the central depression 136 into either of said depressions 137 and 138, and means actuated from the moving table for forcing said member 134 from either depression 137 or 138 back to the central depression 136, substantially as and for the purposes set forth.

14. In a woodworking-machine for the purpose of grooving the ends of assembled stock, a stock-supporting table, means for causing reciprocatory vertical movements of said table, comprising a shaft, a pair of friction devices on said shaft, means for causing the rotation of said devices in opposite directions, means for engaging and disengaging said friction devices, consisting, of a pivoted lever 38, a sleeve 36 with which said lever is connected, and friction-disks 42 and 43 on said sleeve, and means for actuating the said lever 38, consisting, of a standard 135, having depressions 136, 137 and 139, a V-shaped member 134 on said lever adapted to be arranged in said depressions, foot-treadles for forcing said member from the central depression 136 into either of said depressions 137 and 139, spring 138 for drawing member 134 into depression 136, and means actuated from the moving table for lifting said member 134 from either depression 137 or 139 back to the central depression 136, consisting, essentially, of a sector 140 pivotally connected with said standard 135, a pair of horns on said sector adapted to engage said V-shaped member 134, an arm 158, a pair of spring-actuated disks connected with the vertically-moving table, a flexible connection reeled on one of said disks and attached to said arm 158, for forcing the member 134 from the depression 137 during the completed upward movement of the table, and a stud or projection on said table adapted to engage one of the horns of said sector 140, and force the member 134 from the depression 139 during the completed downward movement of the table, substantially as and for the purposes set forth.

15. In a woodworking-machine for the purpose of grooving the ends of assembled stock, a platen 50 provided with a lug 190, a second laterally-moving platen 61 on said platen 50, said platen 61 having a groove, a pair of dogs slidably arranged in said groove, means for securing said dogs in their adjusted positions and a connecting-latch between one of said dogs and said lug 190 substantially as and for the purposes set forth.

16. In a woodworking-machine for the purpose of grooving the ends of assembled stock, a platen 50 provided with a lug 190, a second laterally-moving platen 61 on said platen 50, said platen 61 having a groove, a pair of dogs 181 and 182 slidably arranged in said groove, a right and left threaded screw-bolt connected with said dogs, a set-screw connected with each dog for securing it in its adjusted position, an apron 187 on said dog 181, and a spring-actuated latch connected with said apron and adapted to be brought in holding engagement with the said lug 190, substantially as and for the purposes set forth.

17. In a woodworking-machine for the purpose of grooving the ends of assembled stock, the combination, with a gang of cutters, of a supporting-table, a supporting means on said table, a rotatable stock-holder supported by said means, and mechanism for moving said stock-holder and supporting means in a lateral direction, for shifting the charge in the periphery of the cutters and thereby work a greater width of stock than the maximum capacity of the cutters, substantially as set forth.

18. In a woodworking-machine for the purpose of grooving the ends of assembled stock, the combination, with the frame-pieces 46 and platen thereon, a screw 52 and nut 51 for moving said platen in a longitudinal direction, and means connected with said frame and said screw, arranged and constructed to cause a forwardly-sliding motion of said screw and platen, consisting, of a crank-shaft and crank member, a collar on said screw, a pair of connecting-links between said crank member and collar, and springs, all arranged, substantially as and for the purposes set forth.

19. In a woodworking-machine for the purpose of grooving the ends of assembled stock, the combination, with the frame-pieces 46 and platen thereon, a screw 52 and nut 51 for moving said platen in a longitudinal direction and means connected with said frame and said screw, arranged and constructed to cause a forwardly-sliding motion of said screw and platen, consisting of a crank-shaft and crank member, a collar on said screw, a pair of connecting-links between said crank member and collar, and springs, a lever 174, gears 175 and 176, sector 179, stopping-post 177 and slot 178, all arranged, substantially as and for the purposes set forth.

In testimony that I claim the invention set forth above I have hereunto set my hand this 16th day of February, 1901.

MARCUS B. TIDEY.

Witnesses:
LILLY V. TIDEY,
FREDK. C. FRAENTZEL.